United States Patent
Shaffer et al.

(10) Patent No.: US 8,126,494 B2
(45) Date of Patent: Feb. 28, 2012

(54) SYSTEM AND METHOD FOR PROVIDING A TRUNKED RADIO AND GATEWAY

(75) Inventors: Shmuel Shaffer, Palo Alto, CA (US); David S. Bicknell, Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 570 days.

(21) Appl. No.: 12/340,451

(22) Filed: Dec. 19, 2008

(65) Prior Publication Data

US 2010/0159975 A1  Jun. 24, 2010

(51) Int. Cl.
*H04B 7/00* (2006.01)

(52) U.S. Cl. ..... 455/520; 455/516; 455/436; 379/93.14; 379/135; 379/201.01; 348/14.01; 709/223; 370/329; 370/431; 370/401

(58) Field of Classification Search ............... 455/520, 455/461, 419, 445, 518, 521, 522, 426.1, 455/426.2, 456.1, 456.2; 370/312, 328, 348, 370/390; 709/223; 379/135, 201.01, 93.19, 379/93.14; 348/14.01
See application file for complete search history.

(56) References Cited

U.S. PATENT DOCUMENTS

| | | | |
|---|---|---|---|
| 4,359,603 A | 11/1982 | Heaton | |
| 4,730,306 A | 3/1988 | Uchida | |
| 5,048,082 A | 9/1991 | Krafft et al. | |
| 5,099,510 A | 3/1992 | Blinken et al. | |
| 5,436,896 A | 7/1995 | Anderson et al. | |
| 5,539,741 A | 7/1996 | Barraclough et al. | |
| 5,539,811 A * | 7/1996 | Nakamura et al. | 379/93.14 |
| 5,625,407 A | 4/1997 | Biggs et al. | |
| 5,689,245 A | 11/1997 | Noreen et al. | |
| 5,889,769 A * | 3/1999 | Mizuno | 370/328 |
| 6,006,848 A | 12/1999 | Grube et al. | |
| 6,011,841 A * | 1/2000 | Isono | 379/201.01 |
| 6,011,851 A | 1/2000 | O'Connor et al. | |
| 6,094,578 A | 7/2000 | Purcell et al. | |

(Continued)

FOREIGN PATENT DOCUMENTS

CN  101461152  6/2009

(Continued)

OTHER PUBLICATIONS

U.S. Appl. No. 12/722,389, entitled "System and Method for Providing Data Channel Management in a Network Environment," filed Mar. 11, 2010; Inventors: Shmuel Shaffer, et al.

(Continued)

*Primary Examiner* — Lam T Mai
(74) *Attorney, Agent, or Firm* — Patent Capital Group

(57) ABSTRACT

A method is provided in one example and includes receiving a first channel release notification from a communication network at a trunked radio network gateway connecting one or more trunked radio networks to the communication network. The method also includes determining whether the first channel release notification was generated in response to an initial seizure or a release of a channel in a trunked radio network of the gateway. The method further includes suppressing transmission of a further channel release notification based on data included in the first channel release notification that indicates an origin of the channel seizure or the release causing the first channel release notification to be generated. In more specific embodiments, the data includes parameter values indicating an originating source for the seizure or the release and a responding source generating the channel release notification.

25 Claims, 9 Drawing Sheets

U.S. PATENT DOCUMENTS

| | | | |
|---|---|---|---|
| 6,094,579 A | 7/2000 | Olvera-Hernandez et al. | |
| 6,151,309 A | 11/2000 | Busuioc et al. | |
| 6,178,237 B1 | 1/2001 | Horn | |
| 6,185,205 B1 | 2/2001 | Sharrit et al. | |
| 6,233,315 B1 | 5/2001 | Reformato et al. | |
| 6,327,567 B1 | 12/2001 | Willehadson et al. | |
| 6,374,100 B1 | 4/2002 | Smith et al. | |
| 6,385,461 B1 | 5/2002 | Raith | |
| 6,400,816 B1 | 6/2002 | Hjalmtysson et al. | |
| 6,404,873 B1 | 6/2002 | Beyda et al. | |
| 6,408,327 B1 | 6/2002 | McClennon et al. | |
| 6,418,214 B1 | 7/2002 | Smythe et al. | |
| 6,421,002 B2 | 7/2002 | Krasner | |
| 6,453,022 B1 | 9/2002 | Weinman, Jr. | |
| 6,501,739 B1 | 12/2002 | Cohen | |
| 6,501,740 B1 | 12/2002 | Sun et al. | |
| 6,608,820 B1 | 8/2003 | Bradshaw, Jr. | |
| 6,708,030 B1* | 3/2004 | Horikawa | 455/436 |
| 6,721,284 B1 | 4/2004 | Mottishaw et al. | |
| 6,792,092 B1 | 9/2004 | Michalewicz | |
| 6,813,250 B1 | 11/2004 | Fine et al. | |
| 6,850,496 B1 | 2/2005 | Knappe et al. | |
| 6,873,854 B2 | 3/2005 | Crockett et al. | |
| 6,882,856 B1 | 4/2005 | Alterman et al. | |
| 6,885,874 B2 | 4/2005 | Grube et al. | |
| 6,912,389 B2 | 6/2005 | Bright et al. | |
| 6,944,137 B1 | 9/2005 | Pan et al. | |
| 6,965,767 B2 | 11/2005 | Maggenti et al. | |
| 6,982,961 B2 | 1/2006 | Refai et al. | |
| 6,987,480 B1 | 1/2006 | Kotick et al. | |
| 6,987,841 B1 | 1/2006 | Byers et al. | |
| 6,993,120 B2 | 1/2006 | Brown et al. | |
| 6,996,088 B1* | 2/2006 | Kroon et al. | 370/341 |
| 6,996,406 B2 | 2/2006 | Lection et al. | |
| 6,999,782 B2 | 2/2006 | Shaughnessy et al. | |
| 6,999,783 B2 | 2/2006 | Toyryla et al. | |
| 7,003,286 B2 | 2/2006 | Brown et al. | |
| 7,006,607 B2 | 2/2006 | Garcia | |
| 7,010,106 B2 | 3/2006 | Gritzer et al. | |
| 7,010,109 B2 | 3/2006 | Gritzer et al. | |
| 7,010,275 B2 | 3/2006 | Davies | |
| 7,013,279 B1 | 3/2006 | Nelson | |
| 7,031,700 B1 | 4/2006 | Weaver et al. | |
| 7,034,678 B2 | 4/2006 | Burkley et al. | |
| 7,035,385 B2 | 4/2006 | Levine et al. | |
| 7,058,168 B1 | 6/2006 | Knappe et al. | |
| 7,062,286 B2 | 6/2006 | Grivas et al. | |
| 7,072,952 B2 | 7/2006 | Takehiro et al. | |
| 7,079,857 B2 | 7/2006 | Maggenti et al. | |
| 7,091,851 B2 | 8/2006 | Mason et al. | |
| 7,149,477 B2 | 12/2006 | Ogami | |
| 7,237,117 B2 | 6/2007 | Weiss | |
| 7,271,742 B2 | 9/2007 | Sheha et al. | |
| 7,292,544 B2 | 11/2007 | Roher et al. | |
| 7,328,036 B2 | 2/2008 | Hart et al. | |
| 7,339,900 B2 | 3/2008 | Perlman | |
| 7,352,707 B2 | 4/2008 | Ho et al. | |
| 7,369,513 B1 | 5/2008 | Sankaran | |
| 7,369,530 B2 | 5/2008 | Keagy | |
| 7,379,961 B2 | 5/2008 | Matsuoka | |
| 7,418,090 B2 | 8/2008 | Reding et al. | |
| 7,426,192 B2 | 9/2008 | Amano et al. | |
| 7,460,492 B2 | 12/2008 | Portolani et al. | |
| 7,463,597 B1 | 12/2008 | Kompella | |
| 7,466,812 B1 | 12/2008 | Mahy et al. | |
| 7,508,840 B2 | 3/2009 | Delaney | |
| 7,526,306 B2 | 4/2009 | Brems et al. | |
| 7,558,221 B2 | 7/2009 | Nelson et al. | |
| 7,606,256 B2* | 10/2009 | Vitebsky et al. | 370/439 |
| 7,633,914 B2 | 12/2009 | Shaffer et al. | |
| 7,636,339 B2 | 12/2009 | Shaffer et al. | |
| 7,639,634 B2 | 12/2009 | Shaffer et al. | |
| 7,706,339 B2 | 4/2010 | Shaffer et al. | |
| 7,710,983 B2 | 5/2010 | Zheng et al. | |
| 7,821,978 B2 | 10/2010 | Staack | |
| 7,831,270 B2 | 11/2010 | Kalley et al. | |
| 7,860,070 B2 | 12/2010 | Shaffer et al. | |
| 7,860,958 B2* | 12/2010 | Yoon et al. | 709/223 |
| 7,869,386 B2 | 1/2011 | Shaffer et al. | |
| 7,933,286 B2* | 4/2011 | Vitebsky et al. | 370/431 |
| 7,953,859 B1 | 5/2011 | Kiefhaber et al. | |
| 2002/0152305 A1 | 10/2002 | Jackson et al. | |
| 2004/0139320 A1 | 7/2004 | Shinohara | |
| 2004/0249949 A1 | 12/2004 | Gourraud et al. | |
| 2005/0015444 A1 | 1/2005 | Rambo | |
| 2005/0171954 A1 | 8/2005 | Hull et al. | |
| 2005/0232207 A1 | 10/2005 | Antoniadis et al. | |
| 2006/0114847 A1 | 6/2006 | Dssouli et al. | |
| 2006/0118636 A1 | 6/2006 | Miles et al. | |
| 2006/0165060 A1 | 7/2006 | Dua | |
| 2006/0281471 A1 | 12/2006 | Shaffer et al. | |
| 2007/0030144 A1 | 2/2007 | Titus et al. | |
| 2007/0060144 A1 | 3/2007 | Mills et al. | |
| 2007/0115848 A1 | 5/2007 | Chean et al. | |
| 2007/0202907 A1 | 8/2007 | Shaffer et al. | |
| 2007/0202908 A1 | 8/2007 | Shaffer et al. | |
| 2007/0203996 A1 | 8/2007 | Davitz et al. | |
| 2007/0239824 A1 | 10/2007 | Shaffer et al. | |
| 2007/0266097 A1 | 11/2007 | Harik et al. | |
| 2007/0271336 A1 | 11/2007 | Ramaswamy | |
| 2007/0280203 A1 | 12/2007 | Shaffer et al. | |
| 2007/0282621 A1 | 12/2007 | Altman et al. | |
| 2008/0005249 A1 | 1/2008 | Hart | |
| 2008/0037461 A1 | 2/2008 | Biltz et al. | |
| 2008/0045236 A1 | 2/2008 | Nahon et al. | |
| 2008/0159128 A1 | 7/2008 | Shaffer et al. | |
| 2008/0167049 A1 | 7/2008 | Karr et al. | |
| 2008/0280637 A1 | 11/2008 | Shaffer et al. | |
| 2009/0144377 A1 | 6/2009 | Kim et al. | |
| 2010/0159977 A1 | 6/2010 | Shaffer et al. | |
| 2010/0161727 A1 | 6/2010 | Shaffer et al. | |

FOREIGN PATENT DOCUMENTS

| | | |
|---|---|---|
| EP | 0849964 | 6/1998 |
| EP | 1920568 | 8/2006 |
| EP | 1889495 | 12/2006 |
| EP | 1920615 | 2/2007 |
| EP | 2030338 | 12/2007 |
| FR | 2674355 A | 9/1992 |
| WO | WO01/91485 | 11/2001 |
| WO | WO02/074051 | 9/2002 |
| WO | WO2006/135533 | 12/2006 |
| WO | WO2007/021586 | 2/2007 |
| WO | WO2007/027356 | 3/2007 |
| WO | WO2007/142961 | 12/2007 |

OTHER PUBLICATIONS

PCT International Search Report mailed Feb. 10, 2001 for PCT/EP01/04570; 1 page.

PCT International Search Report mailed Feb. 13, 2003 for PCT/US02/08419; 2 pages.

PCT International Search Report and Written Opinion mailed Sep. 4, 2007 for PCT/US06/19227; 7 pages.

PCT International Preliminary Report on Patentability (1 page) and the Written Opinion of the International Searching Authority (3 pages), mailed Dec. 11, 2007 for PCT/US06/19227.

PCT Notification of Transmittal of the International Search Report mailed Feb. 27, 2007, for PCT/US06/30447; 2 pages.

PCT International Preliminary Report on Patentability (1 page) and the Written Opinion of the International Searching Authority (14 pages), mailed Feb. 12, 2008 for PCT/US06/30447.

PCT Notification of Tranmittal of the International Search Report mailed Apr. 9, 2007, for PCT/US06/30294; 1 page.

PCT International Preliminary Report on Patentability (1 page) and the Written Opinion of the International Searching Authority, or the Declaration (4 pages) mailed Mar. 14, 2008, for PCT/US06/30294.

PCT Notification of Transmittal of the International Search Report and the Written Opinion of the International Searching Authority mailed Sep. 17, 2008 for PCT/US07/12728; 6 pages.

PCT International Preliminary Report on Patentability (1 page) and the Written Opinion of the International Searching Authority (5 pages) mailed Dec. 3, 2008 for PCT/US07/12728.

Trimeche, M., "Digital Rights Management for Visual Content in Mobile Applications," published Sep. 27, 2004; ISBN)-7803-8379-6; © 2004 IEEE; http://ieeexplore.ieee.org; pp. 95-98.

"5 for '05 Technologies," *Urgent Communications: Service, Safety, Security*, Dec. 1, 2004; 6 pages; http://urgentcomm.com/mag/publicsafety/radio_technologies/.

Bender, Ron, et al., "Multiple Choices for Critical Communications," *Urgent Communications, The Official Publication of IWCE*, Oct. 2001, 4 pages; http://urgentcomm.com/mag/radio_multiple_choices_critical_2/.

C3 Maestro$^{IP}$ Dispatch Console, OpenSKY, NetworkFirst, P25$^{IP}$, Data Sheet, Harris Public Safety and Professional Communications, [Printed on Jun. 28, 2011] 2 pages http://www.pspc.harris.com/media/ECR-7160E_tcm27-10458.pdf.

"Collaborative Incident Response," Cisco IPICS, Solution Overview, ©Cisco Systems, Inc. 2010, 2 pages, www.cisco.com/go/ipics,.

Herther, Jay, et al., "Voice-Over-interintranet Protocol for Critical Communications," *Urgent Communications, The Official Publication of IWCE*, Aug. 2001, 3 pages http://urgentcomm.com/mag/radio_voiceoverintranet_protocol_critical/.

Interoperability Gataway, OpenSky, NetworkFirst, P25$^{IP}$, Data Sheet, Harris RF Communications, ECR-7054, 2 pages [Printed on Jun. 28, 2010] http://www.pspc.harris.com/media/ECR-7054E_tcm27-10470.pdf.

"M/A-Com Emphasizes Power of IP in Seven Announcents at APCO," *Urgent Communications: Service, Safety, Security* Aug. 18, 2002, 5 pages http://urgentcomm.com/products/new/radio_macom_emphasizes_power/index.html.

McKay, Jim, "Intact Amid Chaos," *Government Technology*, Mar. 2005, 2 pages http://www.bultronic.net/documents/articles/intact%20amid%20chaos.pdf.

NetworkFirst Interoperability Solved, Data Sheet, M/A-COM, Inc., ECR-7018A, [Printed on Jun. 28, 2011] 6 pages; http://www.kaomminc.com/PDF/NetworkFirstRevised5_03.pdf.

Polk, J., et al., "Dynamic Host Configuration Protocol Option for Coordinate-based Location Configuration Information," Network Working Group, Internet RFC 3825, Jul. 2004, 15 pages.

Rivero-Angeles, Mario et al., "Random-Access Control Mechanism Using Adaptive Traffic Load in ALOHA and CSMA Strategies for EDGE," *IEEE Transactions on Vehicular Technology*, vol. 54, No. 3, May 2005; Abstract Only http://ieeexplore.ieee.org/xpl/freeabs_all.jsp?arnumber=1433259.

VIP Dispatch Console, OpenSky, NetworkFirst, P25IP, Data Sheet, M/A-COM, Inc. ECR-7241C, © 2006 M/A-COM, Inc., 2 pages http://www.bultronic.net/documents/NetworkFirst/VIP%20Dispatch%20Console.pdf.

USPTO Jun. 27, 2011 Notice of Allowance from U.S. Appl. No. 12/340,417.

USPTO Oct. 14, 2011 Nonfinal Office Action U.S. Appl. No. 12/340,468.

U.S. Appl. No. 13/210,967, entitled "System and Method for Providing Channel Configurations in a Communications Environment," filed Aug. 16, 2011; Inventors: Shmuel Shaffer, et al.

Positron Public Safety Systems, "Product Specifications: Power RADIO," http://www.positron911.com/products/powerRADIO/powerRADIO_specs.asp, Dec. 18, 2008, 2 pages.

Thunder Eagle, Inc.—Radio Wireless Alerting Systems, "MRI-100™: Multi Radio Interface," http://www.thuneagle.com/mri100.htm, Dec. 18, 2008, 2 pages.

Wikipedia, "Plectron," http://en.wikipedia.org/wiki/Plectron, Dec. 18, 2008, 2 pages.

Wikipedia, "Minimum spanning tree," http://en.wikipedia.org/wiki/Minimum_spanning_tree, Dec. 18, 2008, 5 pages.

Wikipedia, "Distributed minimum spanning tree," http://en.wikipedia.org/wiki/Distributed_minimum_spanning_tree, Dec. 18, 2008, 5 pages.

\* cited by examiner

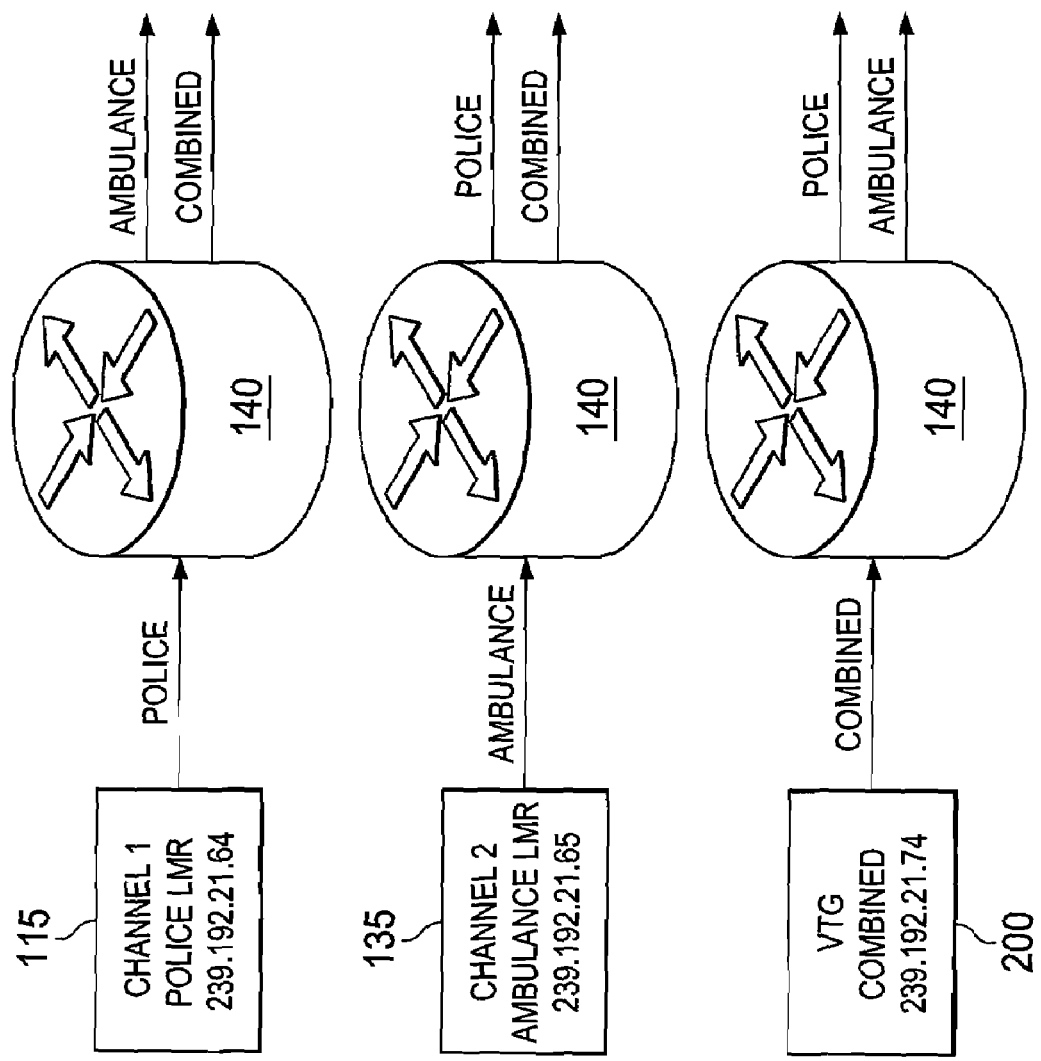

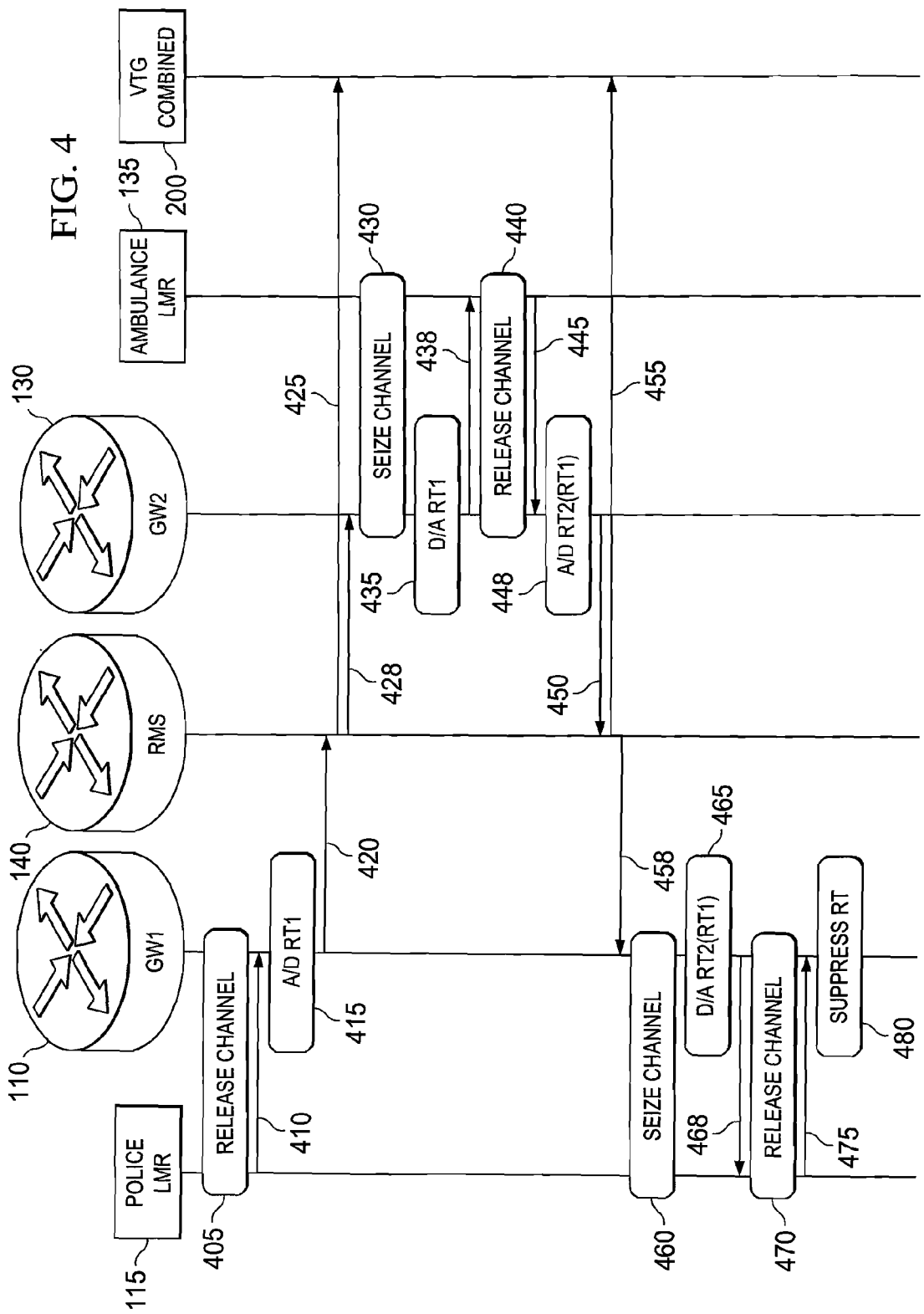

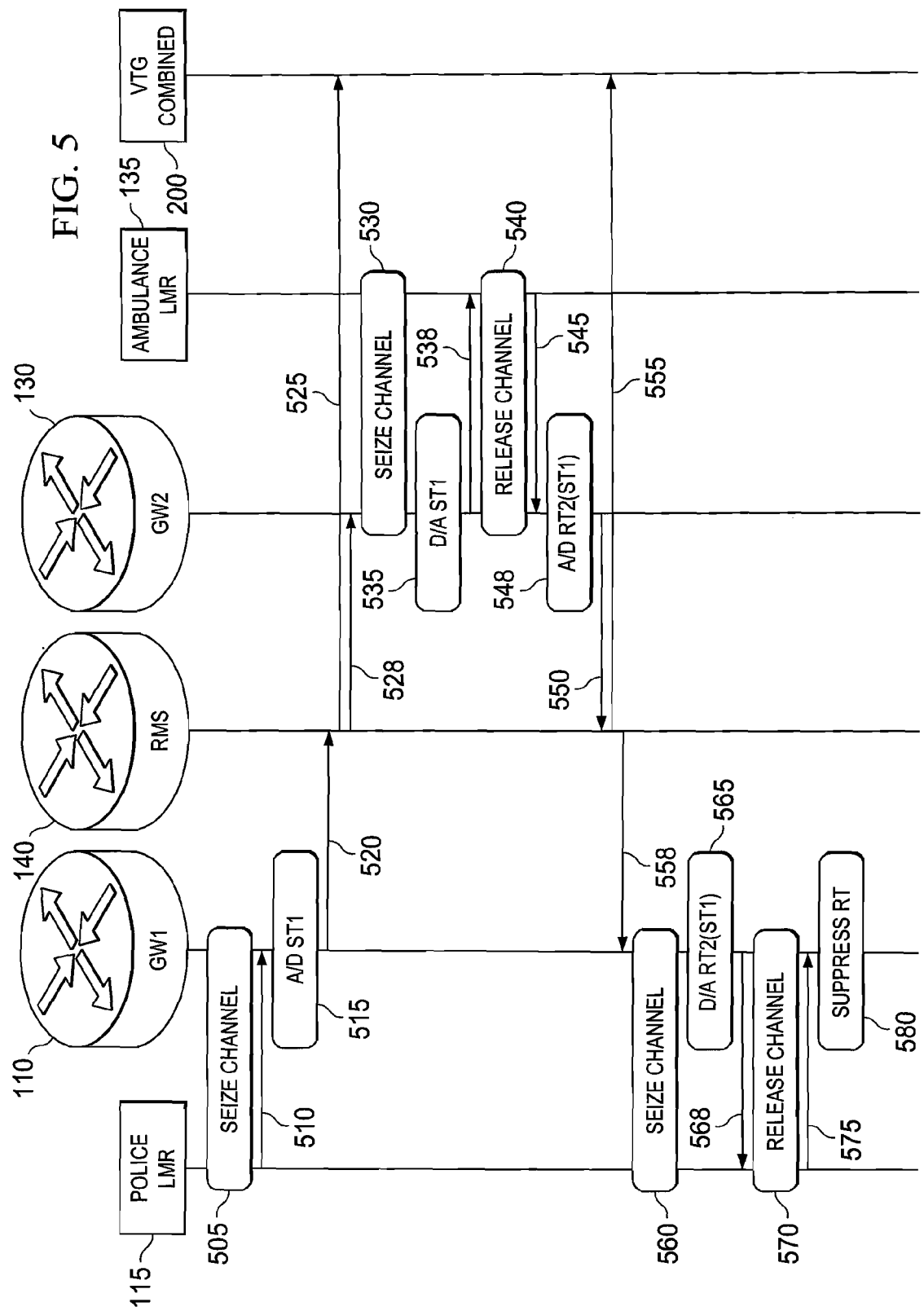

SYSTEM AND METHOD FOR PROVIDING A TRUNKED RADIO AND GATEWAY

TECHNICAL FIELD OF THE INVENTION

The present invention relates generally to communications and, more particularly, to a system and a method for providing a trunked radio and gateway.

BACKGROUND OF THE INVENTION

Communications systems have grown increasingly complex. One such architecture, a trunked radio system, can be used in push to talk (PTT) systems to share channels amongst users. Important to all such architectures is the ability to efficiently manage communications, reduce costs, and properly coordinate communication flows. Thus, the ability to develop a system or a protocol that offers an effective architecture for communication activities provides a significant challenge to network designers, component manufacturers, service providers, and system administrators alike.

BRIEF DESCRIPTION OF EXAMPLE DRAWINGS

An embodiment, incorporating all aspects of the invention, will now be described by way of example only with reference to the accompanying drawings in which:

FIG. 1B is a simplified block diagram that illustrates an example of channel combining using a router media service;

FIG. 4 is an example of an embodiment of a channel release message sequence where ping-pong effects can be mitigated;

FIG. 5 is an example of an embodiment of a channel seizure message sequence where ping pong effects can be mitigated;

DETAILED DESCRIPTION OF EXAMPLE EMBODIMENTS

Overview:

A method is provided in one example and includes receiving a first channel release notification from a communication network at a trunked radio network gateway connecting one or more trunked radio networks to the communication network. The method also includes determining whether the first channel release notification was generated in response to an initial seizure or a release of a channel in a trunked radio network of the gateway. The method further includes suppressing transmission of a further channel release notification based on data included in the first channel release notification that indicates an origin of the channel seizure or the release causing the first channel release notification to be generated. In more specific embodiments, the data includes parameter values indicating an originating source for the seizure or the release and a responding source generating the channel release notification.

A method of managing channel release notification by a trunked radio gateway is proposed. An example of an application of the method is in gateways used for joining trunked radio systems in virtual talk groups via a communication network. A trunked radio gateway can be adapted to connect one or more trunked radio networks to a communication network, whereby one or more of the trunked radio networks can participate in a virtual talk group via the communication network.

Figure 1A:
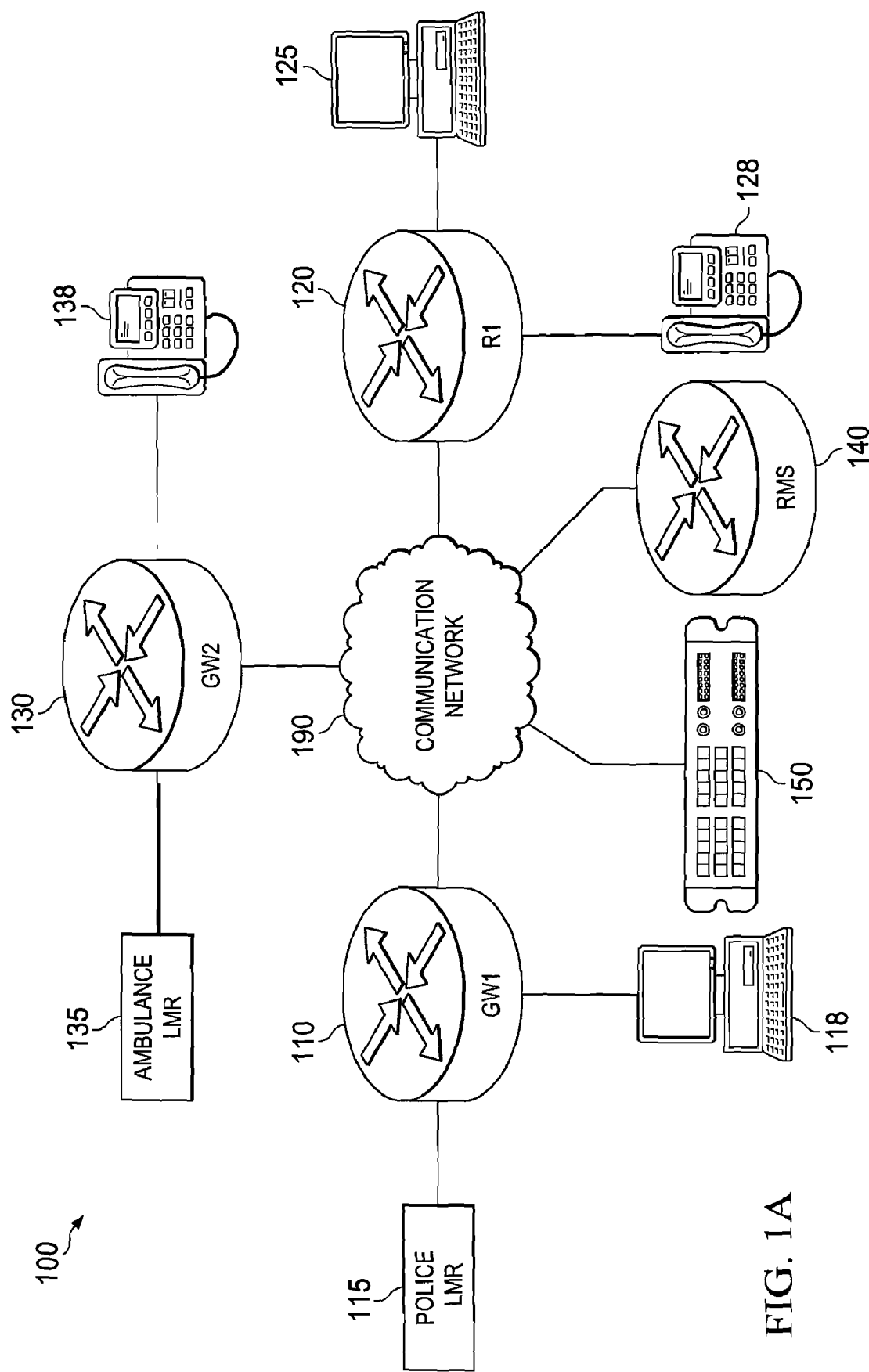
FIG. 1A is a simplified block diagram that illustrates an embodiment of a system for combining two trunked radio networks in a virtual talk group.

A system 100 illustrated in FIG. 1A includes a first trunked radio network that includes a land mobile radio (LMR) 115 having a first gateway 110 for connection to a communication network 190, for example an internet protocol (IP) network. In this example, the LMR is associated with a police group. Note also that any of the LMRs discussed herein may be included in, or be part of, an associated gateway. Alternatively, these items may be their own separate devices.

Gateway 110, in this example, is a router having an interface for converting between digital IP traffic for communication over a communication network 190 and analog traffic for use by radios of the trunked radio network. The interface to the radio network is typically a two or four part audio interface with two signaling elements designated 'E' and 'M.' The interface can be configured for various types of signaling control using the E&M signaling terminals or it can be configured for Voice Audio Detection (VAD). The E&M signaling is described as Ear and Mouth or rEceive and transmit. The audio can be transported on the two or four wire audio transmit and receive conductors. This E&M interface acts as a voice port to a radio channel. This voice port can be mapped to multicast or unicast addresses in the communication network. Addresses can be assigned for each radio network. In the case where more than one trunked radio network is connected to the communication network via the gateway, data streams for each radio network are distinguished using the assigned addresses for each radio network.

Gateway 110 can also connect a computer 118 with the trunked radio network and communication network 190. For example, computer 118 may include functions for a push to talk management console (PMC) for the first radio network. System 100 also includes a second trunked radio network 135 having a second gateway 130 for connection to the communication network. In this example, the LMR is associated with an ambulance group.

As illustrated, a phone 138 can also be connected with the second trunked radio network via gateway 130. Each of the trunked radio networks can generally be used to provide a particular service, for example, the first trunked radio network may be used for a police department radio network and the second trunked radio network may be an ambulance service radio network. Other devices can also be included in the system, for example, as shown in FIG. 1A a router 120 connects a computer 125 and a phone 128 to the communication network 190.

In some implementations, it may be desirable to enable intercommunication between two or more trunked radio networks in virtual talk groups. In the example illustrated, system 100 includes a server 150 and a router media service (RMS) element 140. Server 150 provides administrative functions for managing resources for users, channels, and virtual talk groups (VTGs). This enables interoperability between push to talk handsets on a trunked radio network and other devices such as mobile phones, IP phones, public switched telephone network (PSTN) phones, and PC clients. The router media service 140 performs multicast channel mixing and provides functions for combining two or more VTGs. Although the media service functionality is shown in FIG. 1A as residing within a router attached to the network, the media services may reside on or within any appropriate hardware component attached to network 190.

For purposes of illustrating the techniques of system 10, it is important to understand the somewhat esoteric communications that may be traversing the network and that provide routing information to any given network element. The following foundational information may be viewed as a basis from which the present invention may be properly explained. Such information is offered earnestly for purposes of explanation only and, accordingly, should not be construed in any way to limit the broad scope of the present invention and its potential applications.

Trunked radio systems can also be referred to as Push-to-Talk or Push-to-Transmit (PTT) systems. These systems can also be referred to as land mobile radio systems. PTT refers to a typical manner in which user access the system. For example, a user pushes a TALK button on their radio unit when they wish to transmit. This causes the radio unit to attempt to seize a channel for transmission. If all channels are busy the radio unit cannot seize a channel. If a channel is available, then this channel can be seized for use by the radio unit, and the user can transmit. Once the user has finished talking they release the talk button and in response the channel (or trunk) is released.

One example of a common application for trunked radio systems is dispatch systems for emergency services, such as police ambulance and fire brigade. These systems employ a channel sharing regime known as trunking, where a channel can only be used by one user or group at a time. In multichannel systems a user may be able to select a free channel from a number of channels in the system. Alternatively, user may select and join a specific group, which operates on a dedicated frequency, by tuning his trunk radio to the appropriate frequency used by the said group. Trunking is based on the presumption that each individual subscriber to a system only uses the system a small percentage of the time, thus there is a very low probability of all users requiring system access at the same time. Thus each channel in the system is shared among users and the system is sized such that there is an acceptably low probability of all channels being in use and a subscriber having to wait to gain access to the system. Trunking may also be used by a user who needs to communicate with different groups, each one of them utilizing its own dedicated frequency. In this scenario, the user tunes the frequency of the trunked radio to the appropriate frequency as to facilitate communication with any of the different groups he needs to communicate with. Trunking can improve utilization rates and channel capacity for a given quality of service for a system, compared with a system which allocates dedicated channels to each radio system user.

Each virtual talk group (VTG) can be allocated an IP multicast address. This multicast address will be referred to in this example as the VTG combined channel. In this example, all the IP enabled devices 118, 125, 128, 138 are members of the VTG assigned the combined channel IP multicast address. Data transmitted using the combined channel multicast IP address can be received by each member of the VTG. The RMS can mix data from each of the VTG members into the combined channel multicast stream. Defining which devices are included in the VTG and allocation of multicast addresses can be controlled by server 150. Server 150 can also control the configuration of RMS 140, for example, specifying multicast addresses to be mixed in a VTG.

In the system example of FIG. 1A, the first trunked radio network provides a police channel and the second trunked radio network provides an ambulance channel. The police and ambulance channels of the two trunked radio networks are connected to communication network 190 via their respective gateways 110, 130. The trunked radio network gateways provide voice interoperability between radio and non-radio networks by bridging radio channels and talk groups to IP multicast streams.

In this example, the police radio network and the ambulance radio network are allocated separate IP multicast addresses. These multicast addresses are different from the multicast address of the VTG. RMS 140 provides functionality to combine data transmitted on the police and ambulance channels into the combined channel of the virtual talk group. For example, RMS 140 forwards data streamed on the combined channel to each of the police and ambulance channel IP addresses, and conversely forwards data streamed on either of the police or ambulance channels to both the IP address of the other of the police or ambulance channels and the IP address of the combined channel.

FIG. 1B illustrates data from the police radio network being received by RMS 140. RMS 140 can then route the data and perform multicast mixing, if necessary, in order to output the data from the police channel on both the combined channel (VTG combined element 200) and the channel for the ambulance service, using the respective IP addresses of these services. Data from the ambulance channel can be received by RMS 140 and output to the combined channel and police channel IP addresses respectively. Similarly, data from the combined channel is received by the RMS and output to the police channel and ambulance channel IP addresses respectively. Thus, the police radio network and ambulance radio network can join with the VTG.

This system can rely on the audio mixing capabilities of the RMS. Specifically, when a stream is received by the RMS, which has been configured as a VTG participant, the RMS mixing capabilities should be configured to not retransmit received audio back to the audio streams source. The RMS should be configured to only forward the audio stream to the other participants in the VTG as described above. Where more than one radio network is connected via a gateway, each radio network can be joined in the VTG as described above, using its assigned IP addresses.

It should be appreciated that flow control in the trunked radio networks, enabling only one user at a time to transmit on each channel is controlled internally in each trunked radio network. Audible tones can be used in trunked radio network to notify users of the channel status. For example, tones can be used to notify users when channels are seized or released. A radio network user wishing to transmit can push the TALK button on their radio handset, the corresponding trunked radio can check whether the channel is free, and if the channel is free, it will grant access to the trunked radio channel for transmission. A tone is transmitted on the channel to inform other users that the channel has been seized for transmission. The other users can now only listen to the traffic on the channel. When the first user has finished transmitting he releases the TALK button on his radio and the channel is released. For example, the channel may be released immediately when the user releases the TALK button or after a period of silence. A release tone can be transmitted to all users to indicate the channel has been released and is now free to be seized for transmission by other users.

Figure 2:
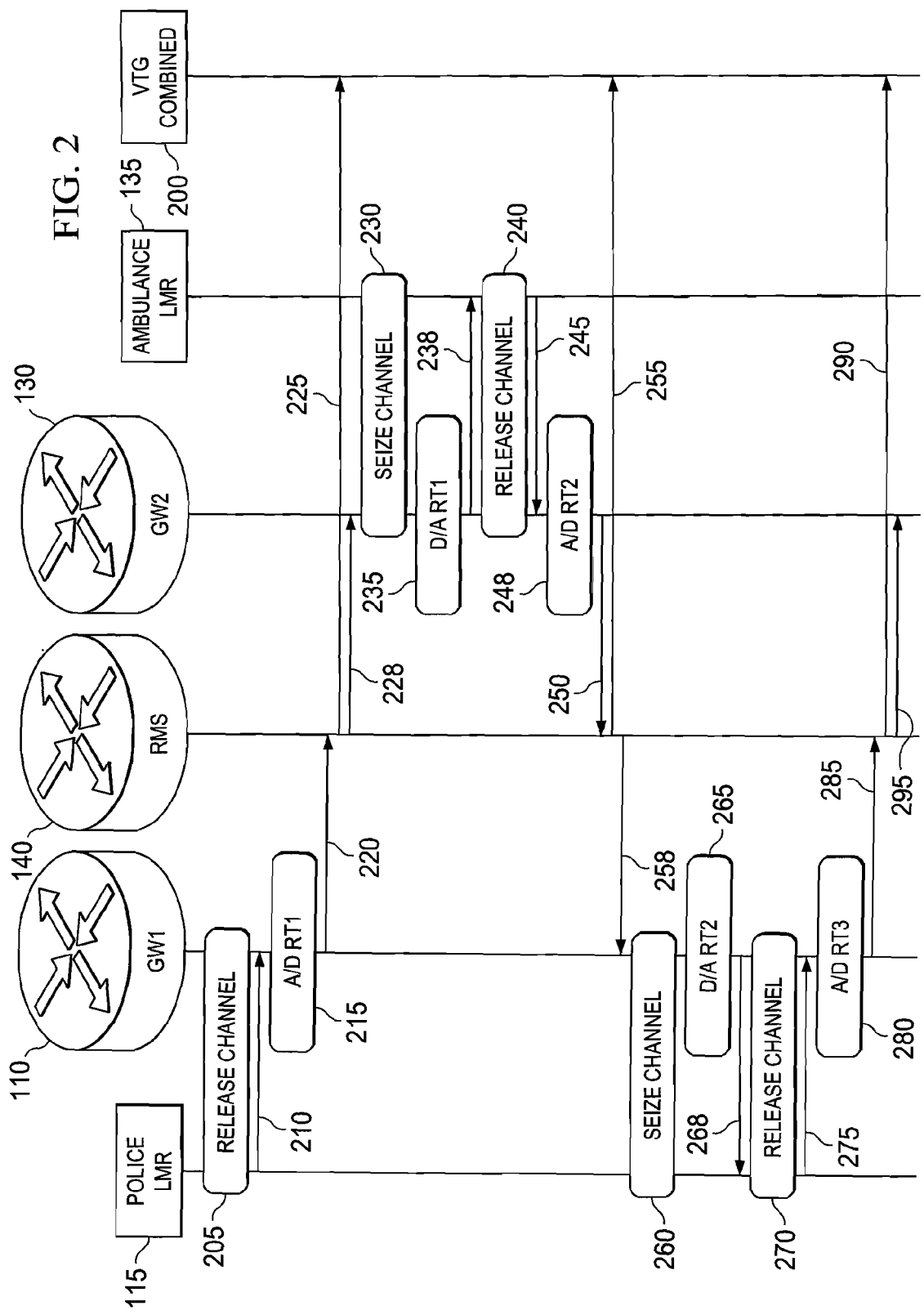
FIG. 2 is an example of a prior art channel release message sequence which can give rise to a ping-pong effect.

As these audible tones are transmitted in channel, in the same manner as a voice signal, problems can occur when two separate trunked radio systems are joined in a virtual talk group (VTG) via a communication network as described above. An example of how such problems can occur should be appreciated from the signaling sequence diagram of FIG. 2 which illustrates a signaling scenario, which may occur in the system of FIG. 1A.

The scenario starts with a release 205 of a police channel in the first trunked radio system, which causes a first analog release tone 210 to be transmitted to the radios in the first trunked radio network to indicate the channel is free. Gateway 110 also converts this first release tone from analog to digital data 215 for transmission 220 to other members of the VTG via the communication network. Gateway 110 transmits the digital data 220 as an audio stream to the IP address of the police channel. When RMS 140 receives this audio stream 220, it can mix the audio stream and forward 225 the audio stream to the other members of the VTG. Data propagation also occurs at element 228: between RMS 140 and gateway 130. The data is forwarded to VTG members on VTG combined element 200 using the combined channel multicast address, and to gateway 130 of the ambulance channel using the IP multicast address assigned for the ambulance channel.

Gateway 130 attempts to seize the channel to transmit the first release tone to radio devices of the ambulance radio network. If seizure is successful, the first release tone is converted (element 235) from digital signal data back to an analog release tone for transmission (element 238) to radios of the ambulance network. Once the release tone is transmitted (element 238), the seized channel is released (element 240), which causes a second release tone to the generated portion (245), indicating the release of the channel in the ambulance network. This second release tone can be transmitted to radio devices in the ambulance radio network and to gateway 130. The gateway converts element 248 the analog second release tone to digital signal data for transmission (element 250) via RMS 140 to other members of the VTG using the IP multicast addresses for the combined channel (element 255) and the police channel (element 258).

Gateway 110 of the police radio network receives the second release tone signal (element 258) and attempts to seize the channel (element 260) to transmit this release tone to radio devices of the police radio network. If the channel cannot be seized, the signaling stops and there is no problem. However, if the channel is successfully seized by gateway 110, then the second release tone is converted from digital data to an analog release tone (element 265) and transmitted (element 268) to radios in the police radio network. The channel is then released (element 270), which causes generation of a third release tone (element 275) which, in turn is converted to a digital signal (element 280) by gateway 110 and transmitted (element 285) to RMS 140 for forwarding (elements 290, 295) to the other members of the VTG. This signal (element 295) can be received by the gateway of the ambulance radio network again requiring further seizure and release of the radio channel and further generation of release tones.

This scenario can create an infinite loop resulting in continuous seizure and release of channels in the two trunked radio systems for the transmission of each system's release tones, creating a "ping-pong" effect, which ties up radio resources unnecessarily and can be problematic as it may prevent other users from using the network. This creates a problem where a virtual talk group includes more than one trunked radio system. This ping-pong effect should persist until channel seizure in one of the radio networks fails.

The ping-pong effect is dependent on the seizure/release timing for each trunked radio system. Inhibiting channel seizure for a delay period after transmission of a release tone and adjusting the delay period can tune the system to avoid or minimize this ping-pong effect. However, this is a difficult and labor intensive consuming process which requires significant skill from an installer to set up and maintain. For example, it may require re-tuning if the network configuration is altered. Further during the delay period users of the trunked radio system cannot seize the channel for new communication.

Alternative, known manual workarounds typically require that additional channels be configured as half duplex for use in VTG's. Since the channels to which end users subscribe should be set as full duplex in order to hear the confirmation tones when they have seized a channel for transmit, additional half duplex "proxy" channels should be added for use in VTG's. These half duplex channels can prevent the tones from being propagated forward, but due to the complexity of the timing configurations, as well as the larger resource consumption, it is not a practical or scalable solution. In these cases, the required tuning adjustments are typically accomplished by adjusting the timing parameters associated with the LMR ports behavior. Including, but not limited to, the amount of time the system should wait after a disconnect condition has been qualified, before it actually idles the channel. This is commonly referred to as hangover time.

Again this configuration is labor intensive and requires significant skill to install. Further, this solution requires some system resources to be used for the manually configured half duplex loops, thus reducing the effective system capacity. Both of these known solutions are timing sensitive and cannot be easily scaled.

Figure 3:
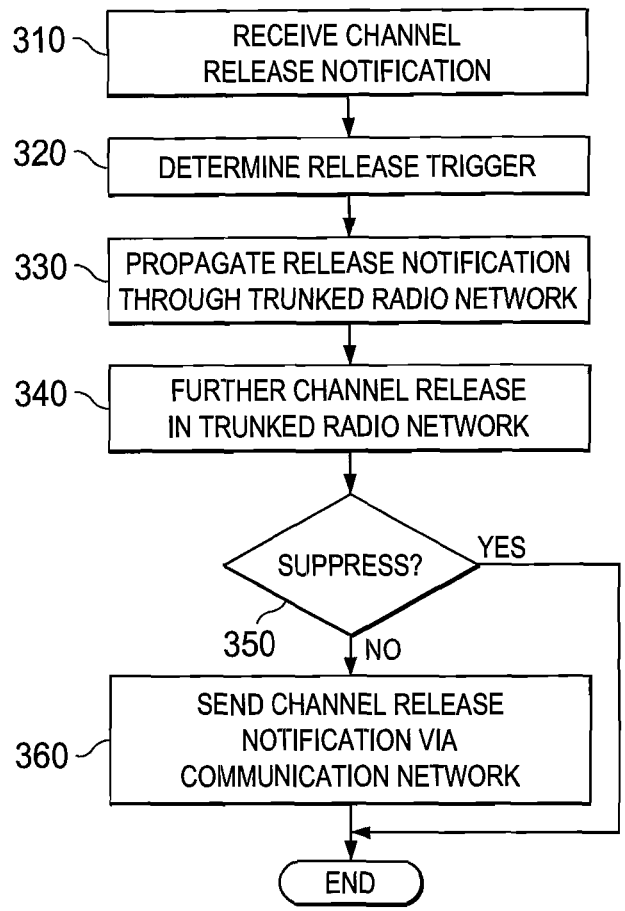
FIG. 3 is a flowchart of an embodiment of a gateway release tone handling process.

FIG. 3 illustrates a method for a trunked radio gateway to manage channel release notification to mitigate ping-ponging problems. The gateway receives a first channel release acknowledgment signal (step 310) from the communication network. It is then determined (step 320) whether the first channel release notification was generated in response to seizure or release of a channel in a trunked radio network of the gateway. The result of this determination should affect whether or not any further release notification is suppressed. Determination of whether or not the first release notification was generated in response to seizure or release of a channel in a trunked radio network of the gateway can be based on analyzing data embedded in the first release notification or based on tracking of channel seize and release actions and associated messages by the gateway.

The gateway propagates (step 330) the first channel release notification though the addressed trunked radio network. In response to this propagation, a further release notification may be generated in the radio network. For example, where the channel is already seized in the radio network the release notification cannot be transmitted so no further release notification should be generated. However, where a channel is seized for transmission of the first release notification, release of this channel after transmission can cause generation of a further release tone (step 340) in the radio network.

When the first channel release notification was generated in response to a channel seizure or release in a trunked radio network of the gateway, the gateway suppresses (step 350) transmission via the communication network of any further channel release notification generated in response to propagating of the first channel release notification through the trunked radio network. For example, with reference to FIG. 2, a further release notification signal (element 285) would not be forwarded by gateway 110 to RMS 140, where gateway 110 determined the channel release in the police radio network was due to propagating a release notification originating from the ambulance radio network due to the first channel release (element 205) in the police radio network.

When it is determined (step 320) that the release notification was not generated in response to a channel seizure or release originating in a radio network connected to the gateway, the gateway sends the further release notification via the communication network (step 360), as described above.

In a case where more than one radio network is connected via a gateway, it can be determined whether the first release notification has been generated in response to a channel seize or release from any radio network of the gateway, and any further release notification suppressed accordingly. For example, if two radio networks of the same gateway are both joined in a VTG, a channel release notification from a first radio network should be transmitted via the communication network using the IP address assigned to the first radio network. The RMS can receive the channel release notification and route this back to the gateway using the IP addresses of the second radio network for propagation through the second radio network of the gateway. The gateway can receive this first channel release notification and can determine that the channel release notification originated from a radio network of the gateway. After propagation of the release notification through the second radio network the gateway can then suppress sending any further release notification via the communication network.

In some embodiments, the first channel release notification includes data indicating the origin of the channel seizure or release causing the first channel release notification to be generated. The gateway of this embodiment can use the origin data to determine whether a received release notification was generated in response to a channel seizure or release in a radio network of the gateway.

An example of a signaling sequence for channel release for this embodiment is illustrated in FIG. 4 for a virtual talk group (VTG) (e.g., as shown in FIG. 1A). When a channel is released (element 405) in the police radio network, a release tone (element 410) is transmitted to radio devices of the police network to indicate the channel has been released and is free to be seized to talk by another user. In the embodiment illustrated, the radio network uses analog transmission and the release tone is an audible tone transmitted on the voice channel. The release tone (element 410) is also received by gateway 110, which connects the police trunked radio network to the communication network for interconnection to other devices and radio networks.

Figure 6:
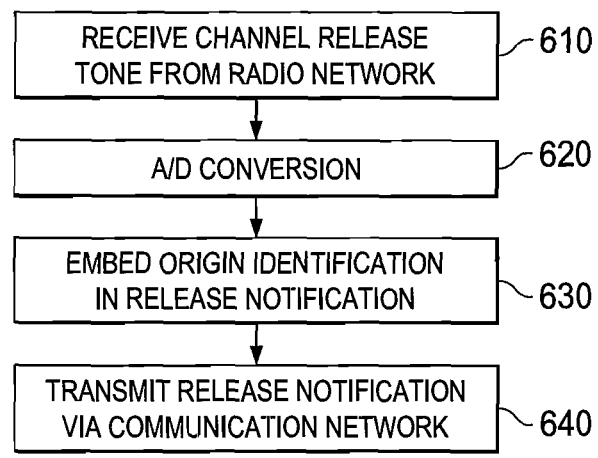
FIG. 6 is a flowchart illustrating an embodiment of a procedure for a gateway handling an original channel release tone received from a connected trunked radio network.

The gateway executes the steps illustrated in FIG. 6 when a release tone (step 610), RT1, is received from the radio. The gateway receives the release tone when the channel is released in the radio network. The gateway converts the analog release tone data to digital data (step 620) for transmission in the communication network. For example, the tone data can be transmitted in the payload of data packets. In this embodiment, gateway 110 is adapted to embed (step 630) data indicating the origin of the channel release in the data transmitted via the communication network. The origin data can be embedded in a notification (e.g., a channel release notification) using stenographic information or bit robbing, or other appropriate protocols to achieve this function.

The origin data may be embedded in payload data or included in a data packet header. For example, a parameter value in the packet header may identify the nature of the packet as a release notification and another parameter value may be a source identifier for a radio device in the police radio network, a channel identifier indicating the channel released, a session identifier allocated by the gateway or a server for the preceding data communication now terminated by the channel release, etc. It should be appreciated that the identification data used may vary between different embodiments of the gateway and all possible variations are contemplated within the various embodiments of the gateway. For example, the identifier and/or parameters used may be varied based on the network protocol being used for communication via the communication network. The origin data may be selected from a number of options available for a particular protocol. The criteria used to select which option is used may be based on performance characteristics, gateway complexity, backwards compatibility, network operator, or equipment provider preference. In some embodiments more than one origin identifier may be used or origin identification data embedded in more than one form, for example to enable compatibility between gateways manufactured by different equipment suppliers.

For example in an embodiment where real-time transport protocol (RTP) is used for transmission of data from the radio network via the communication network, the origin identification data may be embedded in an RTP control packet (RTCP) associated with RTP data packets with release tone data as payload data. In this example, identification data may be one or more of a synchronization source (SSRC) identifier, a contributing source (CSRC) identifier or source canonical name (CNAME) associated with an element of a trunked radio network of the gateway.

The release notification data packets with the embedded origin identification information are then transmitted (step 640) via the communication network. For example, an identifier for the source radio may be included in the CNAME field of an RTCP packet along with a SSRC identifier for the message.

The release notification (element 420) from gateway 110 is received by RMS 140. RMS 140 routes the release notification (step 425) to the combined channel (VTG combined element 200) devices using the combined channel multicast address and, using the ambulance radio network multicast address, routes the release notification (element 428) to the gateway of the ambulance radio network.

Figure 7:
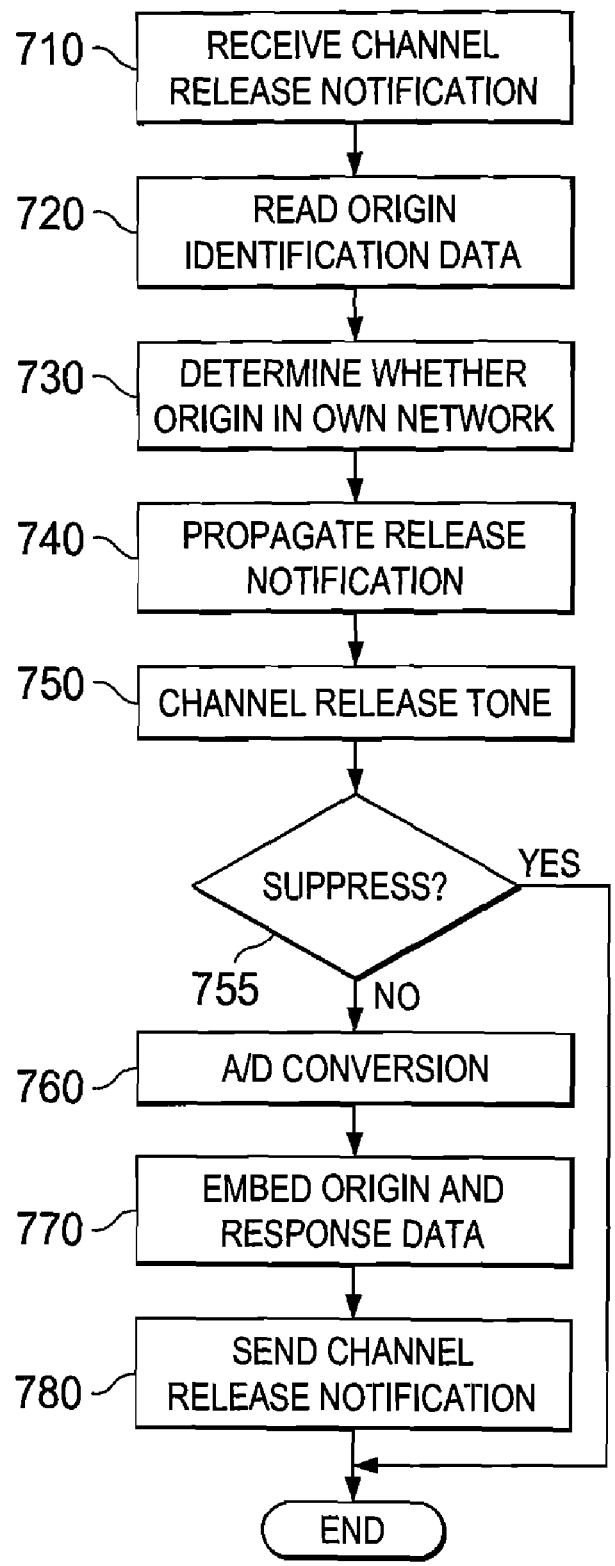
FIG. 7 is a flowchart illustrating a procedure for an embodiment of a gateway handling a release notification received via a connected communication network.

In this example, gateway 130 of the ambulance radio network is adapted to read the origin data from the release notification to determine whether or not the release notification was triggered by seizure or release in the ambulance network. The steps performed by the gateway are illustrated in FIG. 7. Gateway 130 receives (step 710) a release notification (element 428) from the communication network and reads the origin identification data (step 720) embedded in the release notification. For example, the gateway reads parameter values such as the CNAME of the source radio and SSRC identifier from an RTCP packet associated with RTP packets with the release tone as payload data. The gateway determines (step 730) whether or not the release notification was ultimately caused by a seizure or release in the ambulance network from the origin identification data.

For example, the gateway can compare the origin identification data with identification data of elements in the ambulance network. Elements in the ambulance radio network include devices such as radios, base stations, and repeaters etc. The origin identification data can be identification data of the element, such as a device identifier, or alternatively can be identification data associated with the element such as a session identifier for a device's seizure (and subsequent release) of a channel. The gateway can store identification data for each element and compare the origin identification data with the stored identification data to determine whether the origin is from the radio network of the gateway. For example, the gateway can compare the CNAME from the RTCP packet with radio source identifiers in its own network, to determine whether or not there is a match. Alternatively the gateway may compare the SSRC to determine whether the SSRC has been used previously by the gateway, if there is no match then the gateway may also check the CNAME for a match.

The actual criteria used to determine whether the origin is from the radio network of the gateway may vary depending on the identification data used. For example, a partial match between parameter values from the origin identification data and element identification data may be sufficient for a positive determination, depending on the criteria used. In the example of FIG. 4, the origin determination by gateway 130 of the ambulance network should be negative because the channel release notification (element 420) originated from a channel release (element 405) in the police radio network.

The gateway propagates the release notification, RT1, through the radio network (step 740). For example, the gateway seizes a channel (element 430) in the radio network and transmits the release tone, RT1 438, on the seized channel. The gateway can also convert the release tone data from digital data to an analog (element 435) signal for transmission on the voice channel in the ambulance radio network. Once the release tone, RT1, is transmitted, the channel seized for transmission can be released (element 440), generating a further release tone (step 750), RT2 (RT1), from the ambulance radio network.

The gateway should suppress or send this release tone, based on the origin determination outcome. Where there is a positive determination, and the first received release notification was triggered by a channel seizure or release originating from the network of the gateway, the further release tone should be suppressed (step 755) and not transmitted into the communication network.

In the example of FIG. 4, the further release tone RT2 (RT1) was generated in response to a release originating in the police radio network, so the further release notification will not be suppressed. The gateway performs analog to digital conversion of the release tone (step 760) and prepares release notification data packets for transmitting the release tone data RT2 (RT1) via the communication network. As the release notification data packets are generated in response to a received release notification RT1, the origin identification data is again embedded in the release notification packets. Identification data for the further release or data indicating the release notification is an acknowledgement of a first release notification can also be embedded in the release notification packets (step 770), which are then transmitted via the communication network (step 780).

The manner in which the further identification data, indicating that the release notification RT2 (RT1) was generated in response to a first release notification, is embedded in the release notification can vary between embodiments. For example, the release tone (element 445) is converted to digital data (element 448) for inclusion in RTP packet payload data. The associated RTCP packet can include the CNAME for the originating radio source (RT1) and the CNAME for the further release tone (RT2) also may be included in the CNAME or another field. Alternatively, the CSRC may be updated to show both the originating SSRC identifier and a SSRC identifier for the further release tone from the ambulance network as a contributing source RT2 (RT1). The manner in which the identification data is embedded in release notification messages may vary between embodiments and all alternatives are envisaged.

The release notification (element 450) from the ambulance radio network gateway is received by RMS 140. RMS 140 routes the release notification (element 455) to the devices on the combined channel using the combined channel multicast address, and routes the release notification to the police radio network gateway using the police channel multicast address. When the release notification is received (step 710) by the police radio network gateway, gateway 110 executes the process illustrated in FIG. 7 to read the origin identification data (step 720) and determine (step 730) that the release notification RT2 (RT1) was generated in response to a release (RT1) originating from the police radio network. For example by reading CNAME and CSRC data from the RTCP packet and comparing this data with identification and SSRC data for the radios or channels of the police radio network.

The release tone RT2 (RT1) is propagated through the police radio network by the gateway seizing a channel for transmission, converting the release notification data from digital to analog and transmitting the release tone RT2 (RT1). The channel is then released which, in turn causes a further release tone to be generated. Since the gateway has determined that the release notification was caused by a release originating in the police radio network, the gateway suppresses the further release tone and does not send a further release notification via the communication network. It should be appreciated that since transmission of a further release notification is suppressed, the ping-pong effect is alleviated.

In existing implementations, the ping-pong effect can also be triggered by channel seizure. For example, where a radio user in the police radio network presses a TALK button and a channel is seized, a seize tone is transmitted to other radio users to notify them that the channel is seized. In a VTG as illustrated in FIG. 1A a seizure notification is also sent from the police gateway via communication network 190 and RMS 140 to the ambulance radio gateway. The ambulance radio network gateway seizes a channel to transmit the seize tone to devices in the ambulance radio network. Once the seize tone is transmitted the channel is released, causing a release tone to be generated. A release notification is then forwarded by the ambulance radio network gateway to the police radio network gateway via communication network 190 and RMS 140. If the seized channel in the police radio network remains seized, this release notification should not be propagated through the police radio network. However, if the seized channel has been released before the release notification was received, for example if the talk button of the radio is pressed and then quickly released, the channel should be seized again by gateway 110 for transmitting the release tone to the devices in the police radio network. Subsequent release of this channel should cause a further release tone to be generated, triggering the ping-pong effect unless the gateway is adapted to determine whether the further release was generated in response to an action originating from the radio network of the gateway and, where this is the case, suppressing transmission of any further release notification.

In operation of a simplified example involving a trunk release (TR), the gateway between a radio network and an IP network is modified to manage (monitor and track) signals. This embodiment is best explained by describing its operation. When a first radio (R1) issues a radio tone (RT) signal, it sends a corresponding RTCP message and, in this example, we use the notation TR (R1) to describe this RTCP message.

When a second radio (R2) receives this signal, it seizes its trunk and sends the information that R1 has released its trunk to the users of the R2 radio network. When R2 is done sending the information, it releases its trunk and sends a TR tone to radio R1. This tone can be accompanied by an RTCP signal indicating that this TR signal is being sent in response to the completion of transmitting the TR (R1) signal. In this example, we use the notation TR (R2) [TR (R1)] to describe this RTCP message.

The gateway (sometimes referred to as an LMR) to which radio R1 is connected can examine the RTCP associated with the tone it has just received from R2 and, based on the information embedded in the RTCP message, determine that it was the originator of the RT that caused the new message to come back to it. As a result, the gateway associated with R1 can suppress the transmission and, thus, prevent an endless loop from occurring.

In accordance with one example implementation, each gateway keeps a table of all radios in its VTG. For each radio, the system keeps track of the history of messages exchanged and uses this information to prevent loopbacks from being triggered.

In accordance with yet another implementation, the information regarding the origination of the RT signal is embedded in the signal using stenographic information, bit robbing, or any other suitable method.

For the case of a trunk seizure (TS), the gateway between the radio and the IP network is modified to manage (monitor and track) RT signals. When radio R1 issues a RT signal, it sends a corresponding RTCP message. In this example, we use the notation TS (R1) to describe this RTCP message. When radio R2 receives this signal, it seizes its trunk and sends the information that R1 has seized its trunk to the users of the R2 radio network. When R2 is done sending the information, it releases its trunk and sends an RT tone to radio R1. This tone is accompanied by an RTCP signal indicating that this RT signal is being sent in response to the completion of transmitting the TS (R1) signal. We use the notation TR (R2) [TS (R1)] to describe this RTCP message.

The gateway to which radio R1 is connected can examine the RTCP associated with the tone it has just received from R2 and, based on the information embedded in the RTCP message, determine that it was the originator of the RT which caused the new message to come back to it. As a result, the gateway associated with R1 can suppress the transmission and, thereby, prevent a loop from occurring.

In accordance with some examples, each gateway keeps a table of all radios in its VTG. For each radio, the system can store the history of messages exchanged and use this information to prevent loopbacks from being triggered. In accordance with yet another implementation, the information regarding the origination of the RT signal is embedded in the signal using stenographic information, bit robbing, or any other suitable method.

An example of channel seizure is illustrated in FIG. 5 beginning with channel seizure (element 505) by a device in the police radio network. A seize tone (element 510) notifying the successful seizure informs the radio users that the channel is seized. This tone is also received by gateway 110, which converts the tone from analog to digital (element 515) for transmission through the communication network (element 520). In this embodiment, the gateway also embeds seizure origin identification data in the seizure notification. The data embedded in the seizure notification may be only identification data or may also include data identifying the originating action (seizure or release). For example, where RTP is used the tone data can be included in RTP packets as payload data and origin identification data can be included in associated RTCP packets, for example a CNAME, or SSRC. It may also be possible to embed an action data in an RTCP packet, for example using bits reserved for future use which do not currently have a defined purpose in the protocol standard.

The seizure notification is routed by RMS 140 to the combined channel (element 525) and to the ambulance radio network (element 528). Gateway 130 of the ambulance radio network can read the information embedded in the data packets to determine that the message is a seizure notification and therefore know that the data is to be propagated through the radio network or alternatively the seizure notification may be handled similarly to a release notification and the gateway determine whether the action was initiated in the ambulance network.

The gateway seizes a channel (element 530) in the ambulance network, performs digital to analog conversion of the seize tone data (element 535) and transmits the seize tone (element 538) on the seized channel in the radio network. The channel is then released (element 540) causing a release tone to be generated (element 545). The gateway converts the analog release tone to digital data (element 548). The gateway embeds the origin identification data and optionally also response data in the release notification data packets. For example, the gateway may be adapted to update a CSRC in an RTCP packet to identify the contributing source from the ambulance network. The release notification is then transmitted (element 550) via the communication network to RMS 140 which forwards the release notification to the combined channel (element 555) using the combined channel multicast address and to the police radio network (element 558) using the police radio network IP address.

If the police channel is still seized, the release notification should be ignored. However, if the police channel was released (element 508) before the release notification was received, gateway 110 reads origin identification data from the release notification. For the identification data, the gateway determines that the release notification was generated in response to an action, channel seizure, in the police radio network. The gateway seizes the police channel (element 560), performs digital to analog conversion of the release tone data (element 565), and transmits (element 568) the release tone on the police channel. The channel is then released (element 570), which causes generation of a further release tone (element 575). Forwarding of this release tone is suppressed (element 580) by the gateway based on the determination that the first release notification (element 558) was generated in response to a channel seizure (element 505) in the police radio network.

An advantage of this embodiment is that each gateway can positively determine, from the information included in the release notification, whether or not a received release notification was generated in response to a seizure or release in a radio network connected to the gateway. The gateway can then suppress forwarding any further release notification. It should be appreciated that where a release notification is received and the radio network channel is already seized, the gateway will not be able to seize the channel for transmission of the received release tone in the radio network and in this case the release notification can be dropped.

In an alternative embodiment, the gateway determines whether a channel release notification was generated in response to a channel seizure or release in a trunked radio network of the gateway based on a history of notification messages transmitted to and from the gateway.

Figure 8:
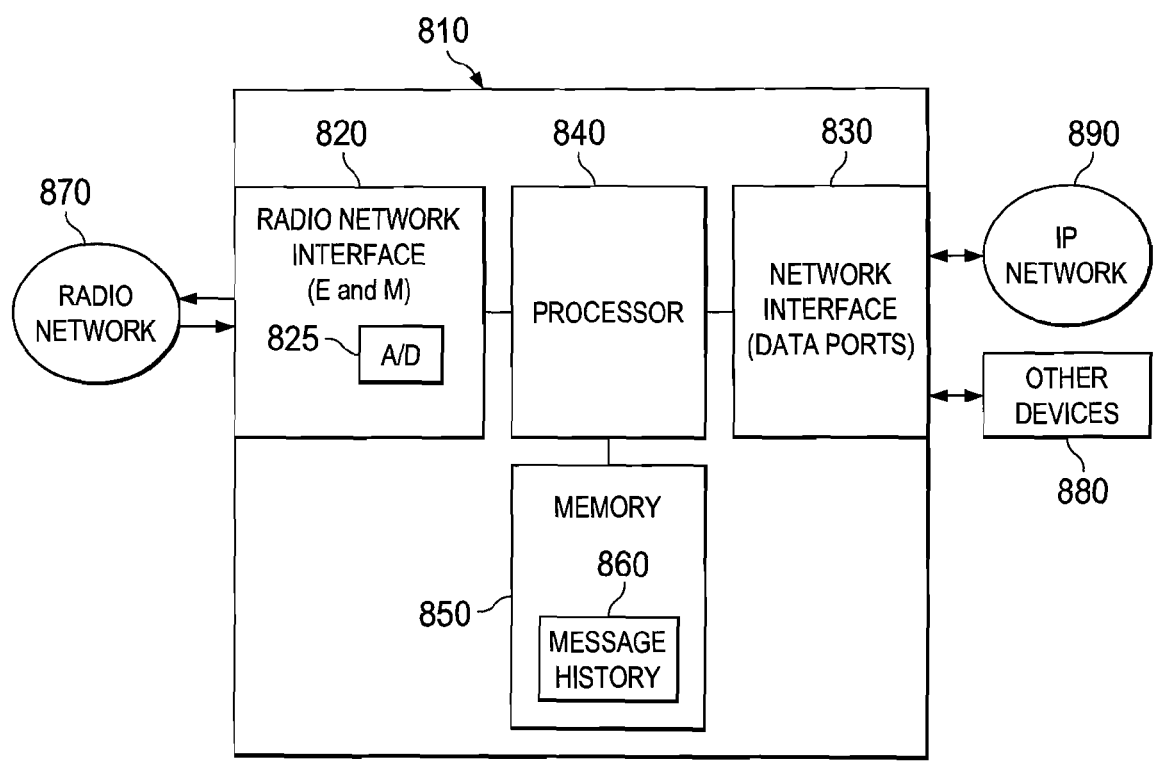
FIG. 8 is a simplified block diagram of an embodiment of a trunked radio network gateway.

A simplified block diagram of an example of a gateway for this embodiment is illustrated in FIG. 8. A gateway 810 comprises a radio network interface 820, a network interface 830, a processor 840, and a memory 850. Radio network interface 820 is an E&M (ear and mouth or rcEive and transmit) interface compatible with devices of radio network 870 the network interface can also include devices such as an analog to digital converter 825 or digital signal processor for processing signals received and transmitted in the radio network. Although the system is described with the E&M interface between the radio network and the gateway, other embodiments may be applied to any other analog or digital interface. Network interface 830 comprises one or more ports for connecting to other devices 880, for example, Ethernet ports, parallel or serial data communication ports, universal serial bus (USB) ports etc. Also coupled to gateway 810 could be data networks (e.g., an IP network 890).

Processor 840 is adapted to perform the processing required for bridging communication between the radio network interface and data ports. In this embodiment, the gateway is adapted to track notification messages passed between radio network 870 and communication network 890 and store a history 860 of notification messages sent to and from the gateway in memory 850. The gateway used the stored notification message history to determine whether a channel release notification received at network interface 830 was generated in response to a channel seizure or release in a trunked radio network 870 of gateway 810 based on a history 860 of notification messages transmitted to and from the gateway.

It should be appreciated that although memory 850 and processor 840 are described in this embodiment as being part of gateway 810, some of the functions attributed in this example to the gateway may be implemented in a server attached to the network.

Figure 9:
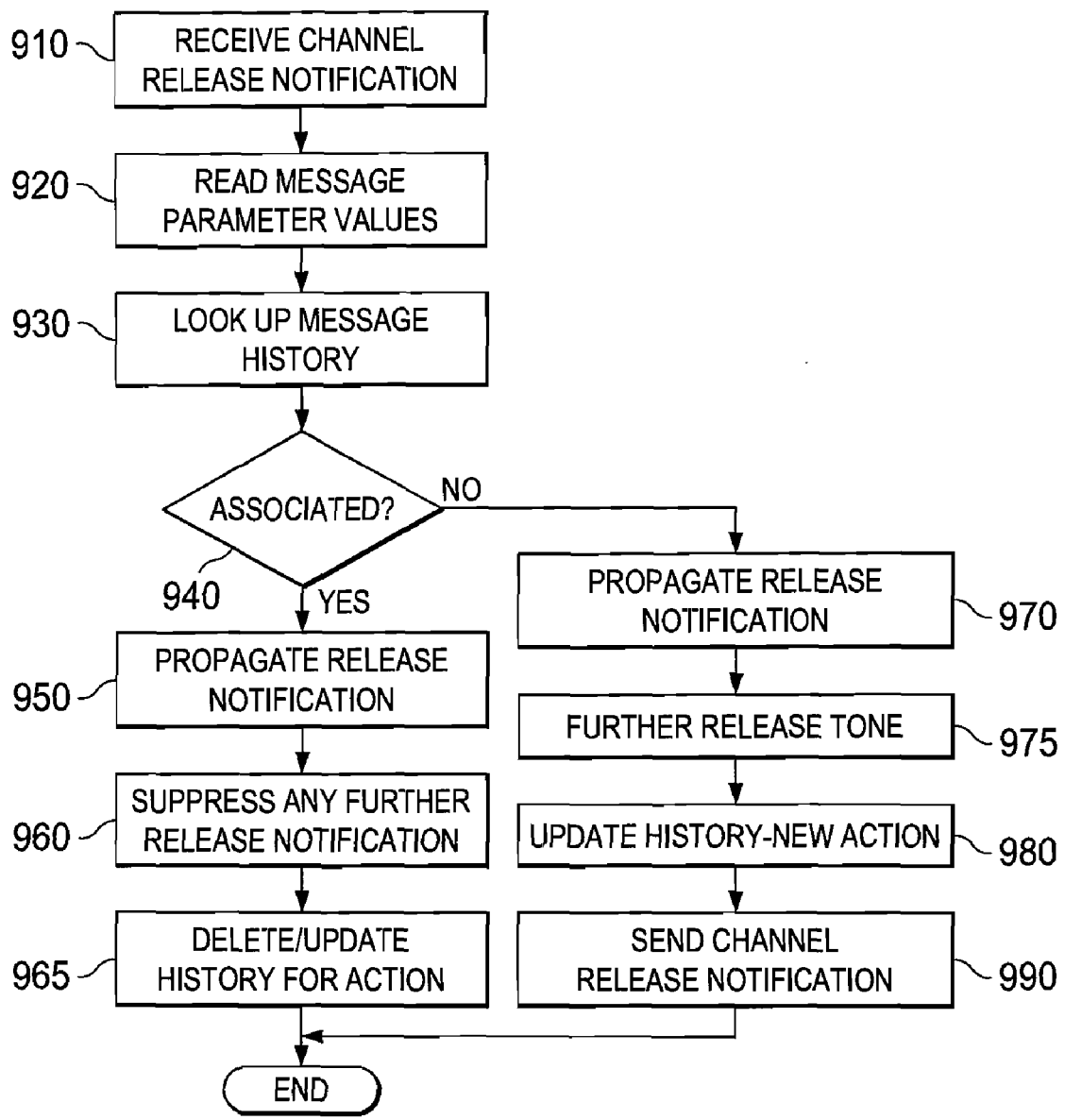
FIG. 9 is a flowchart illustrating an alternative procedure for an embodiment of a gateway handling a release notification received via the communication network.

In an embodiment, described with reference to FIG. 9, the gateway records in gateway memory data for each message, transmitted via the communication network for a channel seizure or release action in the radio network. For example, a message type, channel identifier, transmission time and action (seize or release) can be recorded in a log each time a channel is seized or released and a notification message for the action sent via the communication network.

When a release notification is received by the gateway (step 910) the gateway can read parameter values associated with the release notification (step 920). For example, the gateway may record a timestamp for the time the release notification was received. The gateway may also read parameter values from the release notification message header or data, such as the destination address, origin address, acknowledgement flags, session identification data etc. The gateway then compares the read data with stored history data (step 930). For example, the gateway can look up each entry in the log and compare the read parameter values with the logged data. Some parameter values may be matched against logged data for example matching channels and session identifiers or compared with parameter value thresholds, for example a time threshold to determine whether a release notification is received within a given time from when the notification message for the original seizure or release action was logged. This comparison is used to determine whether or not the release notification was generated in response to a recorded action originating in the radio network (step 940).

Where the release notification is determined to be associated with a recorded action, based on the comparison, then the gateway should propagate (step 950) the release notification is propagated in the radio network (step 950) but any further release tone generated as a result of the release notification is suppressed (step 960) and is not transmitted via the data network. Thus a ping-pong effect is avoided. Data for the logged action can be updated to show that the messaging sequence for the event is completed or deleted (step 965).

Where the release notification is not determined as being associated with a recorded action, based on the comparison, the release notification is assumed to have originated externally from the radio network of the gateway. The release notification is propagated in the radio network (step 970) and a further release notification 975 can be generated in the radio network as a result. In this case the gateway does not suppress forwarding (step 990) of any further release notification generated by the radio network.

It should be appreciated that in this case the gateway can also record the further release notification as a new release action (step 980) in the radio network of the gateway. This is an optional action adapted to mitigate ping-pong effects triggered by a gateway not adapted to suppress release notifications. For example, in a virtual talk group including two or more radio networks it is possible that not all gateways are adapted to suppress transmission of release notification as described in embodiments above. Alternatively the methods used by different gateways may not be compatible, for example where the gateways are provided by different equipment suppliers. It should be appreciated that in this system the ping-pong effect may still occur. However, where a further release notification is generated in response to a received release notification originating in another radio network, the gateway record can record this as a release action. Any subsequent release notification received from the communication network can be associated with this recorded action for suppression of any further subsequent release actions, hence, mitigating the ping-pong effect.

The gateway may be adapted to delete actions logged in the history data (message history 860) stored in gateway memory 850 to minimize the size of the log. It should be appreciated that the ping-pong effect is typically triggered when channels are seized and released within short periods of time, for example transmitting a release tone which may require seizure of the channel for less than one second.

Where a channel is seized for another transmission before a release notification is received the gateway does not propagate a release notification in the radio network, so no further release tones are generated. This means that for some logged seizure and release actions a release notification may never be received or processed by the gateway. After a period of time these logged entries should become obsolete and can be cleared from the log. The time period after which the logged entries become obsolete is based on the time typically take for a release notification to be received. This time may vary between embodiments, for example based on gateway processing time, network latency, VTG configuration etc. The time period may also vary depending on the action, for example where seize tone has a longer duration than the release tone, the time taken for propagating a seize tone through other radio networks and receiving a release notification in response should be different longer than that for a release tone, thus a logged release action can become obsolete more quickly than a seize action.

In some embodiments the gateway is adapted to delete obsolete actions form the log after a given time period expires, the time period may be specified for each action. In some embodiments the time period may be adjusted by a radio network operator. In another embodiment, logged entries are not automatically deleted, instead the gateway can be adapted to only compare a received release notification with logged entries recorded within a given time period preceding reception of the release notification.

In an alternative embodiment the log is circular, such that oldest log entries are overwritten by new log entries. In this embodiment the log should be sized to avoid logged action entries being overwritten before they become obsolete. The size of the log may be adjustable, for example a variable file size or variable buffer length.

In another embodiment the history also includes channel state information which is used to determine whether a received release notification was generated in response to a seizure or release action in the radio network. For example a channel can have two states, seized and released (idle). The gateway can log the state changes for a channel and other relevant information for the state change, such as a timestamp for the state change and the device causing the state change, an example of a log is shown in Table 1.

TABLE 1

| Time | Channel State | Device |
|---|---|---|
| 01:10:01 | Seized | Radio A |
| 01:10:25 | Released | Radio A |
| 01:10:26 | Seized | Gateway |
| 01:10:27 | Released | Gateway |
| 01:12:00 | Seized | Gateway |
| 01:12:03 | Released | Gateway |
| 01:12:04 | Seized | Gateway |
| 01:12:06 | Released | Gateway |
| 01:15:01 | Seized | Radio B |
| 01:15:02 | Released | Radio B |

In this embodiment the gateway can use the channel states and the timing of received release notifications to infer association between the received release notification and actions originating in the radio network based on the channel states. It should be appreciated that in this embodiment is it not necessary to read parameter values identifying the source of the notification message from the message data.

In the example shown in Table 1, Radio A seizing the channel is recorded with a timestamp of 01:10:01, and released the channel at 01:10:25. The channel is next seized by the gateway at 01:10:26 and released at 01:10:27. The temporal proximity of these state changes and the duration of the seizure by the gateway can be used to infer that the seizure by the gateway was for transmitting a release tone for a release notification generated in response to a release notification transmitted from the gateway, due to the release of the channel by Radio A and the gateway suppresses transmission of any further release notification generated by its own seizure and release of the channel for transmission of the release tone.

In another example, with reference to Table 1, at 01:12:00 the gateway seizes the channel, and releases the channel at 01:12:03. In this case there is no preceding channel state change with which the seizure by the gateway could be associated due to the elapsed time between seizures. Further the gateway may be adapted to recognize that the messaging and state change sequence associated with the seizure and release of the channel by Radio A is completed and the preceding entries in the state change table are now obsolete. The channel release should cause a release tone to be generated and a corresponding release notification sent by the gateway via the communication network. At 01:12:04 the gateway again seizes the channel and releases the channel at 01:12:06, in some embodiments it can be inferred by the temporal proximity and duration of these state changes that this seizure and release is for sending a release tone generated in response to the channel release at 01:12:03. Thus, any subsequent release notification can be suppressed. In this case the relationship between the seizure and release state changes is inferred, so errors are possible. However, an advantage of this embodiment is that no parameters need be read from the messages received from the communication network.

In an alternative embodiment release notification messages can be distinguished from other messages transmitted via the communication network. For example, a flag can indicate that the message is a release notification. In this instance the gateway can know that the received message is a release notification and, thus, the channel is seized for transmitting a release tone. Whether or not a release notification is expected, due to a release in the radio network, can be determined from the state change history and therefore the gateway can determine whether or not to suppress transmission of any further release notification messages to avoid the ping-pong effect. It should be appreciated that in this embodiment no additional data needs to be embedded in the release notification to enable the ping-pong effect to be mitigated.

Alternative embodiments may employ a combination of history tracking and embedded identification data. All possible variations are contemplated within the scope of the present application.

In the embodiments discussed above, the functionality for determining whether or not a further release notification is generated in response to an action originating from the radio network is incorporated in the gateway, for example, as a release monitor function performed by the gateway. In some embodiments, a computer program embodying this release monitor functionality may be provided for installation in a radio network gateway to adapt the gateway to perform the above methods.

It should be appreciated that in an alternative embodiment, a release monitor functionality can be provided using a peripheral (or proprietary) device connected to a gateway. For example, the release monitor functionality could be built into a device similar to an external firewall, adapted to be connected between the network interface of the gateway and the communication network and to analyze RTP data packets and RTCP control packets being passed between the radio and communication networks. The peripheral release monitor device can be adapted to identify further release notification packets which are to be suppressed using the methods as described above and drop these packets so they are not transmitted into the communication network. The peripheral release monitor device may be adapted to embed identification data in release notification packets in some embodiments. It should be appreciated that such a release monitor peripheral device can act as an adaptor in some embodiment enabling gateways from different equipment providers to be adapted to use the methods described above, without altering the actual gateway hardware or software.

Software (which manages the operations of the system in accordance with some embodiments of the invention) can reside in the network. By "reside in the network" such terminology is meant connote that the software can be hosted on any suitable device or component in a communications infrastructure. These elements may include any suitable combination of software or hardware to execute the response mechanisms and/or perform the coordination of messages as outlined herein.

Note also that that the terms 'gateway' as used herein in this Specification is inclusive of routers, switches, bridges, load-balancers, firewalls, servers, or any other suitable device, component, element, or object operable to assist in these activities. Moreover, these elements may include any suitable hardware, software, components, modules, interfaces, or objects that facilitate the operations thereof. This may be inclusive of appropriate algorithms and communication protocols that allow for the effective exchange of data or information in the architecture.

The gateway can also include memory elements for storing information to be used in achieving the message management and coordination operations, as outlined herein. Additionally, each of these devices may include a processor that can execute software or an algorithm to perform the messaging activities, as discussed in this Specification. Memory elements and processors (which facilitate these outlined operations) may be included in these gateways or provided externally to these elements, or consolidated in any suitable fashion. The processors can readily execute code (software) for effectuating the activities described. These devices may further keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

These elements could be (or be part of) any the elements included in the FIGURES (e.g., the configurations of FIGS. 1A and 8). Alternatively, these elements could be their own separate proprietary element (e.g., a server) responsible for the activities outlined herein. The elements can coordinate, organize, or otherwise manage any number of activities in terms of forwarding, receiving, communicating, etc. messages propagating in the network.

Note also that the specific coordination and response mechanisms may be provided external to any of the gateways, as opposed to provided internally. In addition, some, all, or none of these operations may be suitably combined across several of these elements, or provided in just one element to accomplish the operations as outlined herein in this document. In some cases, there could be reciprocal software (for example, in end-user devices) that cooperates to facilitate the operations explained herein.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the communication system (and its teachings) are readily scalable and can accommodate a large number of components, as well as more complicated/sophisticated arrangements and configurations. Accordingly, the examples provided should not limit the scope or inhibit the broad teachings of the communication system, as potentially applied to a myriad of other architectures.

It is also important to note that the steps in the preceding flows illustrate only some of the possible scenarios that may be executed by, or within, the communication system. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the tendered communication systems in that any suitable arrangements, chronologies, configurations, and timing mechanisms may be provided without departing from the teachings of the present invention.

Note that the end-user devices described herein (128, 125, 138, etc.) are providing just some of the many examples that could be used in conjunction with the present invention. These devices (referred to as 'end-user devices' as used herein in this document) may include cellular telephone, I-phones, VHF radios, UHF radios, PSTN telephones, IP phones, push-to-talk telephones, laptops, desktop computers, personal digital assistants (PDAs), or any other suitable end-user device capable of exchanging data in the architecture.

Although the present invention has been described in detail with reference to particular arrangements and configurations, these example configurations and arrangements may be changed significantly without departing from the scope of the present invention. For example, although the present invention has been described with reference to particular communication exchanges involving notifications, the communication system can also manage other alerts and events on any pathway. Note also that the term 'notification' as used herein in this Specification is meant to connote any type of message, signal, data exchange, or alert that was intended for one or more end users. The message may inform the end users or apprise them of some situation, or alternatively simply convey some information from a sender. This may include not only notifications, but simple conversational exchanges and/or simple correspondence between two end users operating their end-user devices.

Additionally, although described with reference to possible emergency, police, and fire fighter type applications, the present invention can certainly be used in operational environments where there are simple communication flows propagating amongst users within a given group. These communication environments could involve non-emergency scenarios.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method, comprising:
   receiving a first channel release notification from a gateway;
   determining whether the first channel release notification was generated in response to an initial seizure or a release of a channel in a network of the gateway; and
   suppressing transmission of a second channel release notification based on data included in the first channel release notification that indicates an origin of the initial seizure or the release causing the first channel release notification to be generated.

2. The method of claim 1, wherein the data includes parameter values indicating an originating source for the initial seizure or the release and a responding source generating the first channel release notification.

3. The method of claim 1, wherein the data further includes a parameter value indicating whether an originating source performed the initial seizure or the release.

4. The method of claim 1, wherein the data includes any one or more of a synchronization source (SSRC) identifier, a contributing source (CSRC) identifier, or a canonical name (CNAME) associated with an element of the network of the gateway.

5. The method of claim 1, wherein the data is read from real-time protocol (RTP) control protocol (RTCP) packets associated with RTP data packets transporting the first channel release notification.

6. The method of claim 1, wherein determining whether the first channel release notification was generated in response to a channel seizure or release in the network of the gateway is based on a history of notification messages involving the gateway.

7. The method of claim 1, further comprising:
storing a table of end-user devices that are part of a virtual talk group (VTG) managed by the gateway.

8. The method of claim 1, wherein the data is embedded in the first channel release notification using stenographic information or bit robbing.

9. An apparatus, comprising:
a gateway configured to:
receive a channel release notification, wherein a determination is made whether the channel release notification was generated in response to an initial seizure or a release of a channel in a network, and wherein a further channel release notification is suppressed based on data included in the channel release notification.

10. The apparatus of claim 9, wherein the data includes parameter values indicating an originating source for the initial seizure or the release.

11. The apparatus of claim 9, wherein the data further includes a parameter value indicating whether an originating source performed the initial or release.

12. The apparatus of claim 9, wherein the data includes any one or more of a synchronization source (SSRC) identifier, a contributing source (CSRC) identifier, or a canonical name (CNAME) associated with an element of the network of the gateway.

13. The apparatus of claim 9, wherein the data is read from real-time protocol (RTP) control protocol (RTCP) packets associated with RTP data packets transporting the channel release notification.

14. The apparatus of claim 9, wherein the gateway stores a table of end-user devices that are part of a virtual talk group (VTG) managed by the gateway.

15. A system, comprising:
means for receiving a first channel release notification;
means for determining whether the first channel release notification was generated in response to an initial seizure or a release of a channel in a network of a gateway; and
means for suppressing transmission of a second channel release notification based on data included in the first channel release notification that indicates an origin of the initial seizure or the release causing the first channel release notification to be generated.

16. The system of claim 15, wherein the data includes parameter values indicating an originating source for the initial seizure or the release and a responding source generating the first channel release notification.

17. The system of claim 15, wherein the data further includes a parameter value indicating whether an originating source performed the initial seizure or release.

18. The system of claim 15, wherein determining whether the first channel release notification was generated in response to a channel seizure or release is based on a history of notification messages involving the gateway.

19. The system of claim 15, further comprising:
means for storing a table of end-user devices that are part of a virtual talk group (VTG) managed by the gateway.

20. Logic encoded in non-transitory media for execution and when executed by a processor operable to:
receive a first channel release notification;
determine whether the first channel release notification was generated in response to an initial seizure or a release of a channel in a network of a gateway; and
suppress transmission of a second channel release notification based on data included in the first channel release notification that indicates an origin of the initial seizure or the release causing the first channel release notification to be generated.

21. The logic of claim 20, wherein the data includes parameter values indicating an originating source for the initial seizure or the release.

22. The logic of claim 20, wherein the data further includes a parameter value indicating whether an originating source performed the initial or release.

23. The logic of claim 20, wherein the data includes any one or more of a synchronization source (SSRC) identifier, a contributing source (CSRC) identifier, or a canonical name (CNAME).

24. The logic of claim 20, wherein determining whether the first channel release notification was generated in response to a channel seizure or release in the network of the gateway is based on a history of notification messages involving the gateway.

25. The logic of claim 20, wherein the logic is further operable to:
store a table of end-user devices that are part of a virtual talk group (VTG) managed by the gateway, and wherein the data is embedded in the first channel release notification using stenographic information or bit robbing.

* * * * *